(12) United States Patent
Ma et al.

(10) Patent No.: US 11,985,313 B2
(45) Date of Patent: May 14, 2024

(54) FILTERING METHOD AND APPARATUS, AND COMPUTER STORAGE MEDIUM

(71) Applicant: GUANGDONG OPPO MOBILE TELECOMMUNICATIONS CORP., LTD., Guangdong (CN)

(72) Inventors: Yanzhuo Ma, Guangdong (CN); Shuai Wan, Guangdong (CN); Junyan Huo, Guangdong (CN); Wei Zhang, Guangdong (CN); Mingze Wang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 279 days.

(21) Appl. No.: 17/475,237

(22) Filed: Sep. 14, 2021

(65) Prior Publication Data

US 2022/0007015 A1    Jan. 6, 2022

Related U.S. Application Data

(63) Continuation of application No. PCT/CN2019/105799, filed on Sep. 12, 2019.

(60) Provisional application No. 62/822,949, filed on Mar. 24, 2019.

(51) Int. Cl.
*H04N 19/117* (2014.01)
*G06N 3/04* (2023.01)
*H04N 19/82* (2014.01)
*H04N 19/85* (2014.01)

(52) U.S. Cl.
CPC ............ *H04N 19/117* (2014.11); *G06N 3/04* (2013.01); *H04N 19/82* (2014.11); *H04N 19/85* (2014.11)

(58) Field of Classification Search
CPC ...... H04N 19/117; H04N 19/82; H04N 19/85; G06N 3/04
USPC ....................................................... 375/240.29
See application file for complete search history.

(56) References Cited

U.S. PATENT DOCUMENTS

| | | | | |
|---|---|---|---|---|
| 8,572,184 | B1* | 10/2013 | Cosoi ..................... | H04L 51/212 709/224 |
| 11,132,619 | B1* | 9/2021 | Casas ....................... | G06N 3/04 |
| 2014/0233649 | A1* | 8/2014 | Cheng .................. | H04N 19/865 375/240.16 |

(Continued)

FOREIGN PATENT DOCUMENTS

| CN | 101841701 A | 9/2010 |
|---|---|---|
| CN | 108134932 A | 6/2018 |

(Continued)

OTHER PUBLICATIONS

International Search Report dated Dec. 23, 2019 of PCT/CN2019/105799 (4 pages).

(Continued)

*Primary Examiner* — Dominic D Saltarelli
(74) *Attorney, Agent, or Firm* — Perkins Coie LLP

(57) ABSTRACT

Provided in implementations of the present application are a filtering method and apparatus, and a computer storage medium; the method comprises: acquiring pixel information to be filtered; determining edge information; and inputting the sample information to be filtered and the edge information into a neural network-based filter so as to output filtered pixels, the filter being obtained by an online filtering part combined with an offline filtering part.

12 Claims, 7 Drawing Sheets

To-be-filtered sample information is acquired — S101

Edge information is determined — S102

The to-be-filtered sample information and the edge information are input into a neural network-based filter to output filtered samples, wherein the filter is obtained by using an online filtering portion in combination with an offline filtering portion — S103

(56) References Cited

U.S. PATENT DOCUMENTS

| | | | |
|---|---|---|---|
| 2017/0345130 A1 | 11/2017 | Wang et al. | |
| 2018/0293486 A1* | 10/2018 | Bajic | G06N 3/084 |
| 2018/0302640 A1* | 10/2018 | Li | H04N 19/23 |
| 2020/0296388 A1* | 9/2020 | Bordes | H04N 19/147 |

FOREIGN PATENT DOCUMENTS

| | | |
|---|---|---|
| CN | 108184129 A | 6/2018 |
| CN | 108932697 A | 12/2018 |
| WO | 2017036370 A1 | 3/2017 |

OTHER PUBLICATIONS

Chavan, T. et al. "A Hybrid Deep Neural Network for Online Learning" 2017 Ninth International Conference on Advances in Pattern Recognition (ICAPR), Dec. 27-30, 2017. 6 pages.

Examination Report for Indian Application No. 202127046542 dated Apr. 13, 2022. 6 pages with English translation.

Extended European Search Report for European Application No. 19921828.0 dated May 23, 2022. 10 pages.

Kawamura, K. et al. "CE13-related: Adaptive CNN based in-loop filtering with boundary weights" JVET-N0712; JVET of ITU-T SG 16 WP 3 and ISO/IEC JTC 1/SC 29/WG 11; 14th Meeting; Geneva, CH; Mar. 19-27, 2019. 2 pages.

Wan, S. et al. "CE13-related: Integrated in-loop filter based on CNN" JVET-N0133-V2; JVET of ITU-T SG 16 WP 3 and ISO/IEC JTC 1/SC 29/WG 11; 14th Meeting: Geneva, CH; Mar. 19-27; 2019. 7 pages.

Notice of Hearing of the IN application No. 202127046542, dated May 15, 2023. 3 pages.

Woon-Sung Park et al. "CNN-based in-loop filtering for coding efficiency improvement" 2016 IEEE 12th Image, Video, and Multidimensional Signal Processing Workshop (IVMSP); Publication Date: Nov. 7, 2016.

First Office Action of the Indonesian application No. P00202108550, dated Sep. 25, 2023. 6 pages with English translation.

First Office Action of the Japanese application No. 2021-555871, dated Oct. 31, 2023. 11 pages with English translation.

Kawamura (KDDI) K et al: "CE13-related: Adaptive CNN based in-loop filtering with boundary weights", 14. JVET Meeting; Mar. 19, 2019-Mar. 27, 2019; Geneva; (The Joint Videoexploration Team of ISO/IEC JTC1/SC29/WG11 and ITU-T SG. 16), No. JVET-N0712, Mar. 20, 2019.(2 pages).

Wan S et al: "CE13-related: Integrated in-loop filter based on CNN", 14. JVET Meeting; Mar. 19, 2019-Mar. 27, 2019; Geneva; (The Joint Video Exploration Team of ISO/IEC JTC1/SC29/WG11 and ITU-TSG.16), No. JVET-No. 133, Mar. 17, 2019.(10 pages).

Chavan Trupti R et al: "A Hybrid Deep Neural Network for Online Learning", 2017 Ninth International Conference on Advances in Pattern Recognition (ICAPR), IEEE, Dec. 27, 2017.(9 pages).

* cited by examiner

FILTERING METHOD AND APPARATUS, AND COMPUTER STORAGE MEDIUM

CROSS-REFERENCE TO RELATED APPLICATIONS

The present disclosure is a continuation application of International PCT Application No. PCT/CN2019/105799, having an international filing date of Sep. 12, 2019, which claims priority to a provisional application No. 62/822,949, filed on Mar. 24, 2019. The contents of the above-identified applications are hereby incorporated by reference.

TECHNICAL FIELD

Implementations of the present application relate to the field of video code and decode technology, and more particularly, to a filtering method, a filtering apparatus and a computer storage medium.

BACKGROUND

In a video code and decode system, picture/video filtering is implemented by using filters. A pre-processing filter is used to preprocess an original picture for decreasing a video resolution, because the video resolution which needs to be encoded to represent is lower than the resolution of an original video, the video resolution can be represented by using fewer bits, so as to improve coding efficiency of the overall; a post-processing filter processes an in-loop filtered video to output the video for improving the video resolution; an in-loop filter is used to improve subjective and objective quality of reconstructed pictures.

The pre-processing filter, in-loop filter and post-processing filter are all implemented by using a convolutional neural network, and the filters based on the convolution neural network can be divided into two categories, one is trained offline and the other is trained online. For the filters trained offline, all weight parameters of the neural network can be set at both a coding end and a decoding end after the training is completed. However, because weight coefficients are fixed, the performance of the filters may degrade in the case of some video contents. For the filters trained online, all the weight parameters of the network need to be retrained and updated frequently, so the weight coefficients need to be transmitted in a bitstream, calculation amount and complexity is high, and the weight coefficients are applicable to processing of the video contents in a narrow range and are relatively limited.

SUMMARY

Implementations of the present application provides a filtering method, a filtering apparatus and a computer storage medium, which can improve a filtering performance of the filtering apparatus and have a wide application range.

The technical solutions of the implementations of the present application may be implemented as follows.

An implementation of the present application provides a filtering method, including: acquiring to-be-filtered sample information; determining edge information; and inputting the to-be-filtered sample information and the edge information into a neural network-based filter to output filtered samples, wherein the filter is obtained by using an online filtering portion in combination with an offline filtering portion.

An implementation of the present application further provides a filtering method, used for encoding a video, including: determining filtering parameters of an adaptive filter; filtering input samples by using the adaptive filter according to the filtering parameters and edge information to obtain filtered samples; determining first filtering parameters, herein the first filtering parameter are a portion of the filtering parameters which need to be encoded; and encoding the first filtering parameter and the first filtering parameter is signaled in a video bitstream.

An implementation of the present application further provides a filtering method for decoding a video bitstream, including: parsing a video bitstream and determining first filtering parameters of an adaptive filter, herein the first filtering parameters are a portion of all filtering parameters of the adaptive filter; determining all the filtering parameters of the adaptive filter according to the first filtering parameter; and filtering input samples by using the adaptive filter according to all the filtering parameters and edge information to obtain filtered samples.

An implementation of the present application provides a filtering apparatus, including: a first acquisition portion, configured to acquire to-be-filtered sample information; a first determination portion, configured to determine edge information; and a filtering portion, configured to input the to-be-filtered sample information and the edge information into a neural network-based filter to output to obtain filtered samples, herein the filter is obtained by using an online filtering portion in combination with an offline filtering portion.

An implementation of the present application further provides a filtering apparatus for encoding a video, including: a second determination portion, configured to determine filtering parameters of an adaptive filter; a second filtering portion, configured to filter input samples by using the adaptive filter according to the filtering parameters and edge information to obtain filtered samples; herein the second determination portion is further configured to determine a first filtering parameter, herein the first filtering parameter is a portion of the filtering parameters which need to be encoded; and a second writing portion, configured to encode the first filtering parameter, and the first filtering parameter is signaled in a video bitstream.

An implementation of the present application further provides a filtering apparatus for decoding a video, including: a third determination portion, configured to parse a video bitstream and determine a first filtering parameter of an adaptive filter, herein the first filtering parameter is a portion of all filtering parameters of the adaptive filter; and determine all the filtering parameters of the adaptive filter according to the first filtering parameter; and a third filtering portion, configured to filter input samples by using the adaptive filter according to all the filtering parameters and edge information to obtain filtered samples.

An implementation of the present application further provides a filtering apparatus, including: a memory used for storing executable instructions; and a processor used for implementing the filtering methods provided by the implementations of the present application when executing the executable instructions stored in the memory.

An implementation of the present application provides a computer storage medium having stored therein executable instructions, which is used for causing a processor to perform the filtering methods provided by the implementations of the present application.

The implementations of the present application have the following beneficial effects: A filtering apparatus, for to-be-filtered sample information, determines edge information of a video to be filtered, and inputs the edge information and the to-be-filtered sample information into a filter for filtering, to output the filtered samples. Because the filter is obtained by using an online filtering portion in combination with an offline filtering portion, the offline filtering portion can be used in the filtering, which is applicable to filtering a wide range of videos; meanwhile, updating of parameters of the online filtering portion can be ensured to avoid the degradation of filtering performance, such that the filtering performance of the filtering apparatus can be improved, and the application range is wide.

DETAILED DESCRIPTION

In order to understand features and technical contents of implementations of the present invention in more detail, implementations of the implementations of the present invention will be described in detail below in combination with the accompanying drawings, which are for reference only and are not intended to limit the implementations of the present invention.

In a video code and decode system, a video to be encoded includes an original video, which includes an original picture. The original picture is processed in various manners, such as prediction, transformation, quantization, reconstruction and filtering. In these processing procedures, sample values of processed video picture may have shifted from the original picture, resulting in visual obstacles or artifacts. In addition, under a block coding unit (CU)-based hybrid coding framework used by most video code and decode systems, due to using different encoding parameters (such as different transformation processes, different quantization parameters (QPs), different prediction methods, different reference pictures, etc.) by adjacent coding blocks, the sizes of errors introduced in various coding blocks and mutual independence of their distribution characteristics, and discontinuity of a boundary between the adjacent coding blocks, blocking effect is generated. Such distortions affect the subjective and objective quality of reconstructed picture blocks. If the reconstructed picture blocks are used as a reference picture of subsequent coding samples, the distortions will even affect the prediction accuracy of the subsequent code and decode, and further affect the size of bits in a video bitstream. Therefore, a pre-processing filter, a post-processing filter and an in-loop filter are often added to the video code and decode system to improve subjective and objective quality of the reconstructed pictures.

Figure 1:
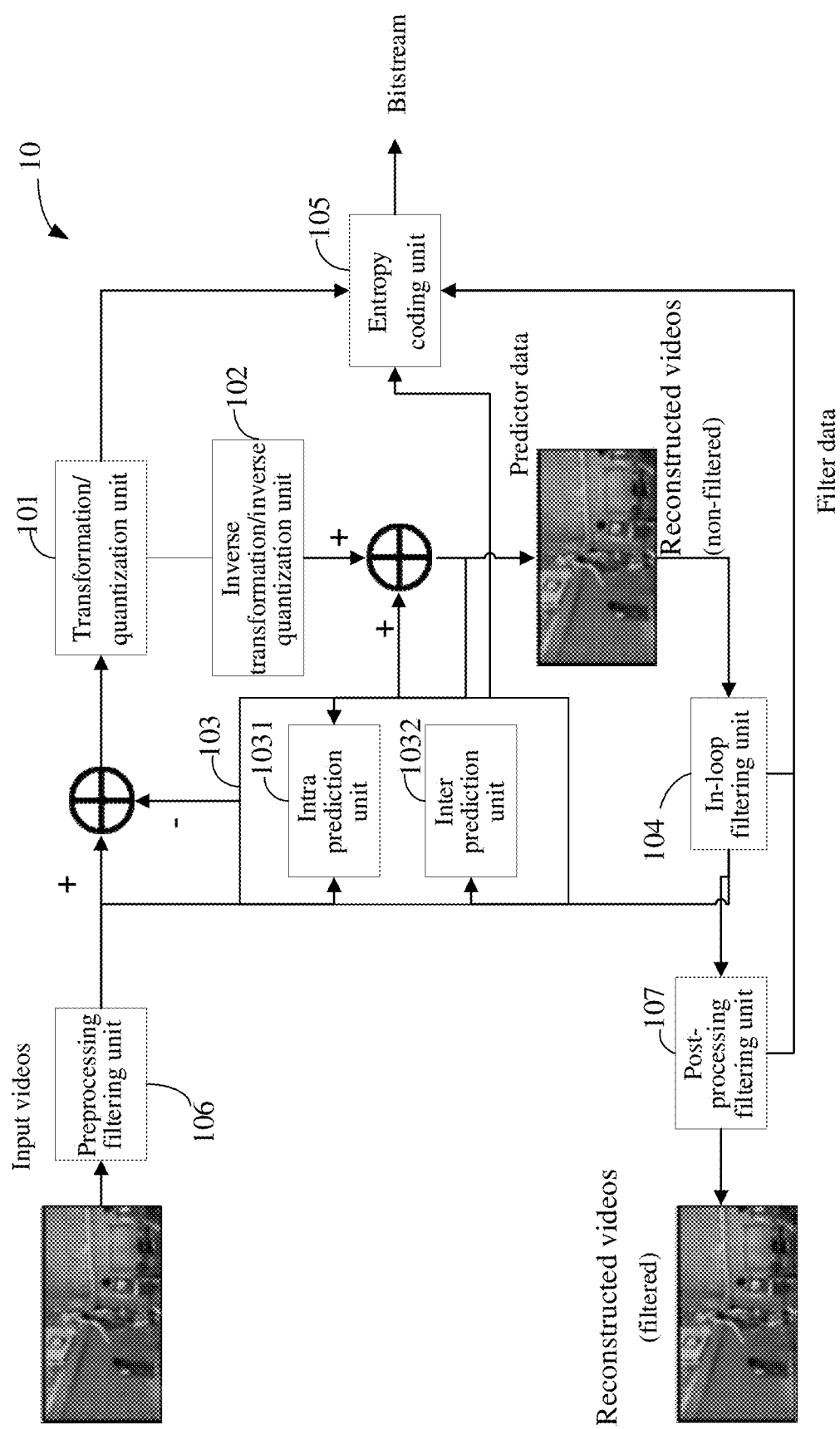
FIG. 1 is a schematic structural diagram of an encoder block diagram in accordance with an implementation of the present application.

FIG. 1 is a schematic structural diagram of a conventional encoder block diagram. As shown in FIG. 1, the conventional encoder block diagram 10 may include components such as a transformation and quantization unit 101, an inverse transformation and inverse quantization unit 102, a prediction unit 103, an in-loop filtering unit 104, an entropy coding unit 105, a pre-processing filtering unit 106 and a post-processing filtering unit 107. The prediction unit 103 further includes an intra prediction unit 1031 and an inter prediction unit 1032. A coding tree unit (CTU) can be obtained by dividing preliminarily the input original picture, and a CU can be obtained by further dividing adaptively contents of the CTU, the CU generally containing one or more coding blocks (CBs). Residual information can be obtained by performing intra prediction by the intra prediction unit 1031 or inter prediction by the inter prediction unit 1032 on the coding block. The residual information is transformed on the coding block by the transform and quantization unit 101, including transforming the residual information from a sample domain to a transform domain and quantizing the obtained transform coefficients to further reduce the bit rate. After determining a prediction mode, the prediction unit 103 is further used to provide the selected intra prediction data or inter prediction data to the entropy coding unit 105. In addition, the inverse transform and inverse quantization unit 102 is used for reconstructing the coding blocks, reconstructing residual blocks in a sample domain, removing blocking artifacts from the reconstructed residual blocks by the in-loop filtering unit 104, and then adding the reconstructed residual blocks to a decoded picture buffer unit to generate a reconstructed reference picture. The entropy coding unit 105 is used for encoding various encoding parameters and quantized transform coefficients. For example, the entropy coding unit 105 may use header information to code and context-based adaptive binary arithmetic coding (CABAC) algorithms to encode coding information indicating the determined prediction mode, to output the corresponding bitstream.

For the conventional encoder block diagram 10 in FIG. 1, the in-loop filtering unit 104 is a loop filter, which is also referred to as an in-loop filter; it may include a De-Blocking Filter (DBF), a Sample Adaptive Offset (SAO) filter, and an Adaptive Loop Filter (ALF). The DBF is used to implement de-blocking filtering. In the next generation video coding standard H.266/Versatile Video Coding (VVC), for all coding block boundaries in an original picture, a boundary strength is firstly determined according to encoding parameters at both sides of the boundaries, and a filtering decision of whether de-blocking is carried out is determined according to a calculated block boundary texture value. Finally, sample information at both sides of the coding block boundaries is corrected according to the boundary strength and the filtering decision. In the VVC, in order to reduce quantization distortion of high-frequency AC coefficients after de-blocking filtering is carried out, an SAO technology, that is, a sample adaptive compensation filter, is further introduced. Further, starting from the sample domain, negative values are added to samples at crests and positive values are added to samples at troughs for compensation processing. In the VVC, after the de-blocking filtering and the sample adaptive compensation filtering are performed, filtering processing needs to be further carried out by using the adaptive loop filter. For adaptive loop filtering, an optimal filter in a mean square error sense is calculated according to sample values of the original picture and sample values of a distorted picture.

For the conventional encoder diagram 10 in FIG. 1, the pre-filtering unit 106 is used to receive input original video and perform pre-processing filtering on the original video to reduce the video resolution. The post-processing filtering unit 107 is used to receive in-loop filtered videos and perform post-processing filtering on the in-loop filtered videos to improve the video resolution. Thus, the reconstructed videos can be obtained with less bits in the video code and decode process, so as to improve the overall code and decode efficiency. At present, an input to a neural network used by both a pre-processing filter and a post-processing filter is a single input or multi-input, that is, inputting a single picture component or multiple picture components, to implement the reconstruction of the picture.

Figure 2:
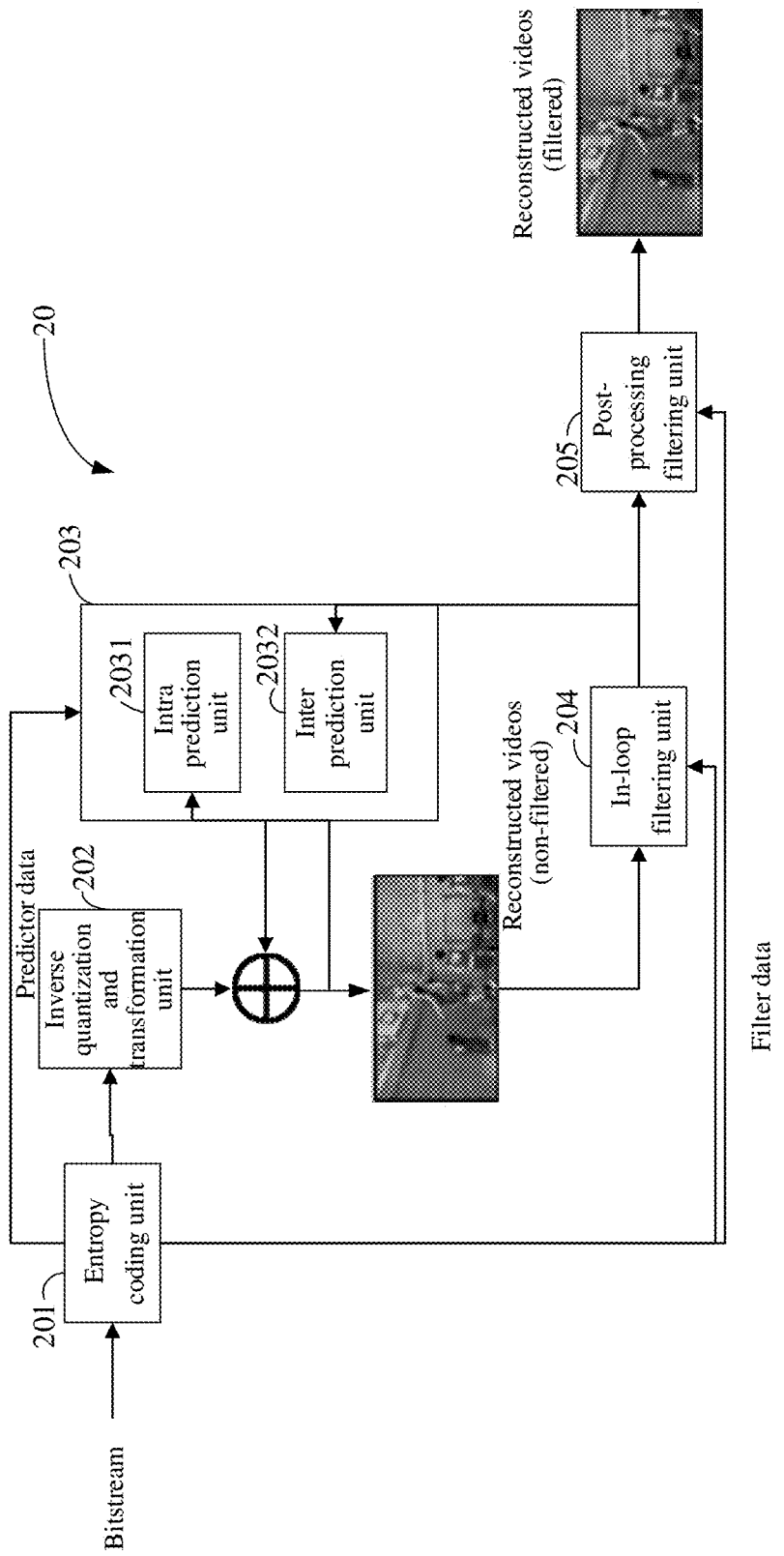
FIG. 2 is a schematic structural diagram of a decoder block diagram in accordance with an implementation of the present application.

Similar to the encoder block diagram in FIG. 1, FIG. 2 is a schematic structural diagram of a decoder block diagram. As shown in FIG. 2, the conventional decoder block diagram 20 may include components such as an entropy coding unit 201, an inverse quantization and transformation unit 202, a prediction unit 203, an in-loop filtering unit 204, and a post-processing filtering unit 205. The prediction unit 203 further includes an intra prediction unit 2031 and an inter prediction unit 2032. Herein, it should be noted that the video decoding process is a process opposite or inverse to the video coding process. The post-processing filtered picture obtained is determined as the reconstructed videos in the video decoding process. It can be seen from FIG. 2 that the pre-processing filtering unit in the coding process is not involved in the decoding process, and only the post-processing filtering unit and the in-loop filtering unit are involved.

In the implementation of the present application, the pre-processing filtering unit, the post-processing filtering unit and the in-loop filtering unit can all be considered to be one type of filters, and the filters in the implementations of the present application may be a convolutional neural networks (CNN) filter or another filter established by deep learning, which is not specifically limited in the implementations of present application.

Taking the convolution neural network filter as an example, the convolution neural network filter can not only replace the pre-processing filtering unit, post-processing filtering unit and in-loop filtering unit in FIG. 1, but also partially replace any one or two of the pre-processing filtering unit, post-processing filtering unit and in-loop filtering unit in FIG. 1, or even be used in combination with any one of more of the pre-processing filtering unit, post-processing filtering unit and in-loop filtering unit in FIG. 1. It should also be noted that each of the components shown in FIG. 1, such as the transformation and quantization unit 101, the inverse transformation and inverse quantization unit 102, the prediction unit 103, the in-loop filtering unit 104, the entropy coding unit 105, the pre-processing filtering unit 106 and the post-processing filtering unit 107, may be either a virtual module or a hardware module. In addition, a person skilled in the art may understand that these units do not constitute a limitation to the encoder block diagram, and the encoder block diagram may include more or fewer components than those shown in the figure, or combinations of some components, or different arrangements of the components.

In an implementation of the present application, when the convolutional neural network filter is used as the in-loop filtering unit, after performing a filtering network train, the convolutional neural network filter can be directly deployed at a coding end and a decoding end. Moreover, the convolution neural network filter can also process auxiliary information such as edge information together with the input picture to be filtered. Thus, not only a relationship of picture edge information is fully utilized, but also the subjective and objective quality of video reconstructed pictures in the code and decode process is further improved. When the convolutional neural network filter is used as the post-processing filtering unit, the convolutional neural network filter can be directly deployed at the decoding end after performing the filtering network train. When the convolutional neural network filter is used as the pre-processing filtering unit, the convolutional neural network filter can be directly deployed at the coding end after performing the filtering network train.

It should be noted that the filtering methods in the implementations of the present application can be applied to a coding system and/or a decoding system when the types of filters are different. For example, in order to save the coding rate and ensure that the decoding system can perform correct decoding processing, the in-loop filter in the implementation of the present application must be deployed synchronously in the coding system and the decoding system.

In the implementation of the present application, no matter the convolutional neural network filter is used as what kind of filter, filters based on the convolutional neural network can be divided into two categories, one is trained offline and the other is trained online. For the filters trained offline, all weight parameters of the neural network can be set at the coding end and the decoding end after the training is completed. However, since the weight coefficients are fixed, the performance of the filters may degrade in the case of some video contents. For the filters trained online, all the weight parameters of the network need to be retrained and updated frequently, so the weight coefficients need to be transmitted in a bitstream, the calculation amount and complexity is high, and the weight coefficients are applicable to processing of the video contents in a narrow range and are relatively limited.

In view of the cases described above, an implementation of the present application provides a filtering method, which is applied to a filtering apparatus. The filtering apparatus can be arranged in a pre-processing filter and an in-loop filter in an encoder, or in an in-loop filter and a post-processing filter in a decoder, or can also be applied to other filters used in other prediction processes, which is not specifically limited in the implementations of the present application.

That is, the neural network-based filter is applicable to post-processing filtering, in-loop filtering, pre-processing filtering and prediction process.

In an implementation of the present application, when the neural network-based filter is applicable to post-processing filtering, it is arranged at the decoding end; when the neural network-based filter is applicable to in-loop processing filtering, it is arranged at the decoding end and the coding end; when the neural network-based filter is applicable to pre-processing filtering, it is arranged at the coding end.

Figures 3, 4:
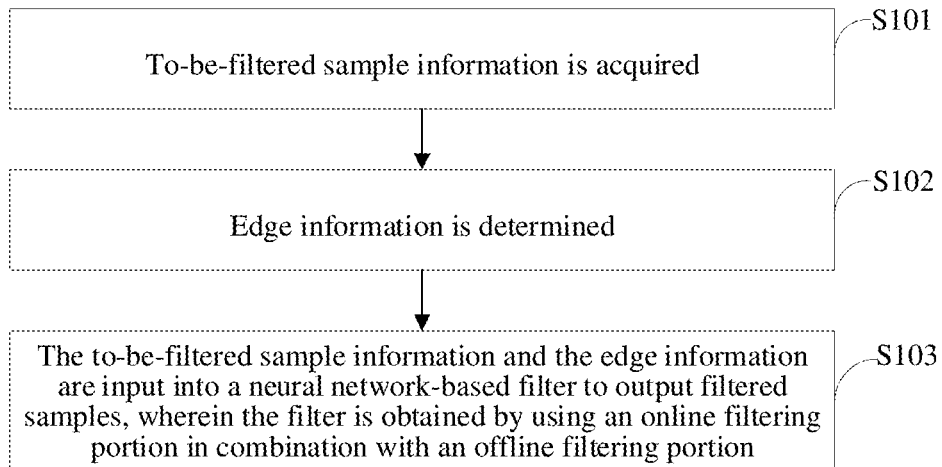
FIG. 3 is a flow chart of an optional filtering method in accordance with an implementation of the present application.
FIG. 4 is a schematic structural diagram of a block division matrix in accordance with an implementation of the present application.

FIG. 3 is a flow chart of an optional filtering method in an implementation of the present application. As shown in FIG. 3, the filtering method may include acts S101-S103.

In the act S101, to-be-filtered sample information is acquired.

In the act S102, edge information is determined.

In the act S103, the to-be-filtered sample information and the edge information are input into a neural network-based filter to output to obtain filtered samples, herein the filter is obtained by using an online filtering portion in combination with an offline filtering portion.

In the act S101, in an implementation of the present application, videos to be filtered are generated in the video coding process of an original picture in a video to be encoded. The video to be encoded includes an original picture, which include the original picture.

It should be noted that in an implementation of the present application, the videos to be filtered contain multiple pictures, and a filtering apparatus filters the to-be-filtered sample information of each picture.

In the act S102, for each picture in the videos to be filtered, there is one piece of corresponding edge information, that is, the edge information corresponding to the to-be-filtered sample information of each picture. The edge information represents boundary information of each picture.

It should be noted that in an implementation of the present application, the original picture may be divided into CTUs, or the CTUs may be divided into CUs. That is to say, the edge information in an implementation of the present application may refer to CTU division information or CU division information. Thus, the filtering method in an implementation of the present application may be applied not only to a CU-level filtering, but also to a CTU-level filtering, which is not specifically limited in the implementations of the present application. The CU division information serving as the edge information will be described below by way of example.

In an implementation of the present application, based on the original picture in the video to be encoded, the original picture is divided into coding units (CU) to obtain CU division information. For the CU division information, a first value is filled in each sample point position corresponding to a CU boundary and a second value is filled in other sample point positions to obtain a first matrix corresponding to the CU division information, wherein the first value is different from the second value; and the first matrix herein is the edge information of each picture.

It should be noted that the first value may be a preset value, a letter, etc. The second value may also be a preset value, a letter, etc., as long as the first value is different from the second value. For example, the first value can be set to 2 and the second value can be set to 1, which is not limited in the implementations of the present application.

In the act S103, the filtering apparatus filters the to-be-filtered sample information of the videos to be filtered through a filter in combination with the edge information to obtain the filtered samples, and it can be understood that a filtered picture is finally obtained, herein the filter is obtained by using the online filtering portion in combination with the offline filtering portion.

In an implementation of the present application, the filtering apparatus may use the CU information as auxiliary information to assist in the filtering of the videos to be filtered, that is to say, in the video coding process of the original picture in the video to be encoded, the CU division information can be fully utilized to guide the filtering after fused with the videos to be filtered.

In some implementations of the present application, the CU division information is converted into a coding unit map (CUmap), which is represented by a two-dimensional matrix, i.e., a CUmap matrix, that is, a first matrix in an implementation of the present application. That is to say, taking the original picture as an example, it can be divided into a plurality of CUs, and the first value is filled in each sample point position corresponding to each CU boundary, while the second value is filled in other sample point positions, thus a first matrix reflecting the CU division information can be constructed. Illustratively, referring to FIG. 4, which shows a schematic structural diagram of a block division matrix in an implementation of the present application. As shown in FIG. 4, if this figure shows a CTU, then the CTU can be divided into 9 CUs. Assuming that the first value is set to 2 and the second value is set to 1. Thus, 2 is filled in each sample point position corresponding to each boundary of the CUs, while 1 is filled in other sample point positions. That is to say, the sample point positions filled with 2 represent the boundary of the CUs, so as to determine the CU division information, that is, edge information of one picture of the videos to be filtered.

It should be noted that, in an implementation of the present application, the CU division information may also be corresponding based on a picture component level, which is not limited in the implementations of the present application.

In an implementation of the present application, the filter is formed by an online filtering model concatenated with an offline filtering model; or the filter is formed by of an online filtering model concatenated with an offline filtering model, herein there are some online trained parameters in the offline filtering model; or the filter is formed by an offline filtering model, herein there are some online trained parameters in the offline filtering model.

When the filter is formed by the offline filtering model, the implementation process in which the filtering apparatus filters the to-be-filtered sample information of the videos to be filtered through the filter in combination with the edge information to obtain the filtered samples may be that: the filtering apparatus filters the videos to be filtered in combination with the edge information by using the offline filtering model to obtain a filtered picture, that is, the to-be-filtered sample information and the edge information are input into the neural network-based offline filtering model to output the filtered samples.

When the filter is formed by the online filtering model concatenated with the offline filtering model, or when the filter is formed by the online filtering model concatenated with the offline filtering model (part of which can be trained online), the implementation process in which the filtering apparatus filters the to-be-filtered sample information of the videos to be filtered through the filter in combination with the edge information to obtain the filtered samples is that: the filtering apparatus filters the videos to be filtered in combination with the edge information bt using the offline filtering model to obtain an intermediate filtered picture, and filters the intermediate filtered picture in combination with the edge information by using the online filtering model to obtain a filtered picture; or the filtering apparatus filters the videos to be filtered in combination with the edge information by using the online filtering model to obtain an intermediate filtered picture, and filters the intermediate filtered picture in combination with the edge information by using the offline filtering model to obtain a filtered picture. That is, the to-be-filtered sample information and the edge information are input into the neural network-based offline filtering model to output the intermediate filtered samples; the intermediate filtered samples and the edge information are input into the neural network-based online filtering model to output the filtered samples; or the to-be-filtered sample information and the edge information are input into the neural network-based online filtering model to output the intermediate filtered samples; the intermediate filtered samples and the edge information are input into the neural network-based offline filtering model to output the filtered samples.

That is to say, in an implementation of the present application, the filter may be formed by using an online convolutional neural network in combination with an offline convolutional neural network. For example, one offline model is concatenated with one online model, or one offline model is used, but part of it can be trained online, or one offline model (part of which can be trained online) is concatenated with one online model, which is not limited in the implementations of the present application.

The offline filtering model is an offline trained filter; the offline filtering model further includes offline trained parameters.

The online filtering model is an online trained filter, herein the online filtering model includes online trained parameters.

In particular, the offline filtering model refers to the offline trained filter, and the convolutional neural network needs to be trained with a large number of pictures and tested on the pictures divided from a training set. If the performance is very effective, it can be applied to filters such as in-loop/post-processing filters in the video code and decode technology. All the weight parameters (i.e., parameters) in the convolutional neural network may be set at both the coding end and the decoding end after the training is completed.

The online filtering model refers to the online trained filter. The convolutional neural network is often trained based on random access segments (some videos just encoded in a video sequence) to obtain updated parameters. The updated online filtering model using the updated parameters processes subsequent frames of the same video sequence. Such convolutional neural network is small in scale and can only be applied to processing of a very narrow range of video sequences.

Illustratively, the filter is formed by an online filter model 1 (Online trained NN) concatenated with an offline filter model 2 (Offline trained NN). A concatenating sequence shown in FIG. 5 or a concatenating sequence shown in FIG. 6 can be used. For the filter in FIG. 5, the filtering apparatus inputs the to-be-filtered sample information 4 and its corresponding edge information 3 into the offline filtering model 2, and obtains the intermediate filtered sample 5 after offline filtering. Then, the intermediate filtered sample 5 and the edge information 3 are input into the online filtering model 1 for online filtering, and the filtered sample 6 is filtered output. For the filter in FIG. 6, the filtering apparatus inputs the to-be-filtered sample information 4 and its corresponding edge information 3 into the online filtering model 1, and obtains the intermediate filtered sample 5 after online filtering. Then, the intermediate filtered sample 5 and the edge information 3 are input into the offline filtering model 2 for offline filtering, and the filtered sample 6 is filtered output.

Figure 7:
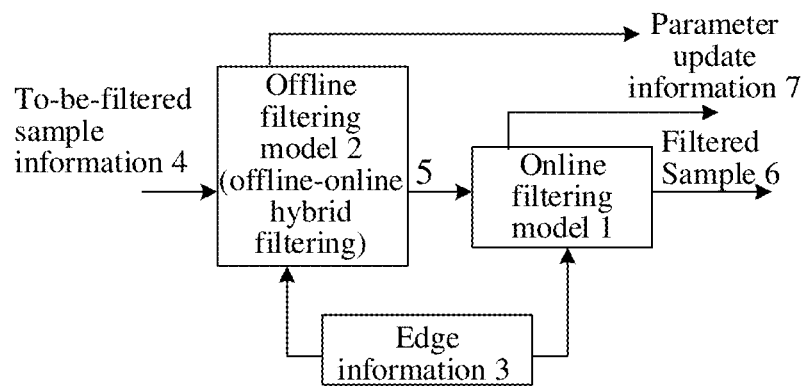
FIG. 7 is a schematic diagram of a third connecting mode of a filter in accordance with an implementation of the present application.
Figure 8:
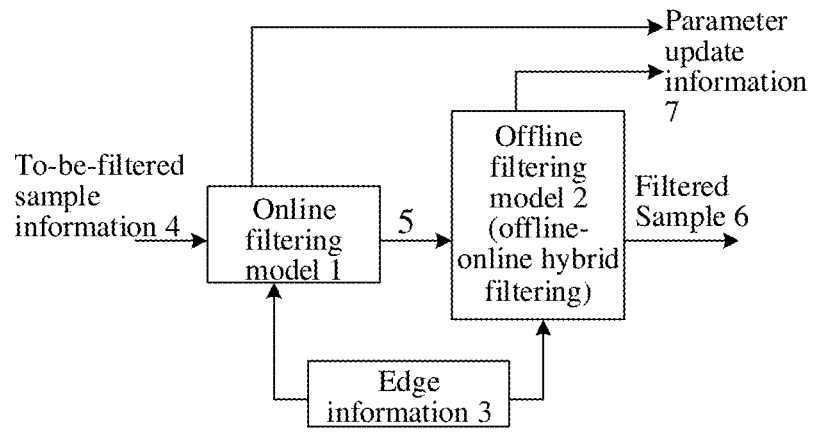
FIG. 8 is a schematic diagram of a fourth connecting mode of a filter in accordance with an implementation of the present application.

Illustratively, the filter is formed by an online filtering model concatenated with an offline filtering model, herein, there are some online trained parameters in the offline filtering model. A concatenating sequence as shown in FIG. 7 or a concatenating sequence as shown in FIG. 8 can be used. As shown in FIG. 7, the filtering apparatus inputs the to-be-filtered sample information 4 and its corresponding edge information 3 into the offline filtering model 2, and obtains the intermediate filtered sample 5 after offline-online hybrid filtering. Then, the intermediate filtered sample 5 and the edge information 3 are input into the online filtering model 1 for online filtering, and the filtered sample 6 is filtered output. For the filter in FIG. 8, the filtering apparatus inputs the to-be-filtered sample information 4 and its corresponding edge information 3 into the online filtering model 1, and obtains the intermediate filtered sample 5 after online filtering. Then, the intermediate filtered sample 5 and the edge information 3 are input into the offline filtering model 2 for offline-online hybrid filtering, and the filtered sample 6 is filtered output.

Figure 9:
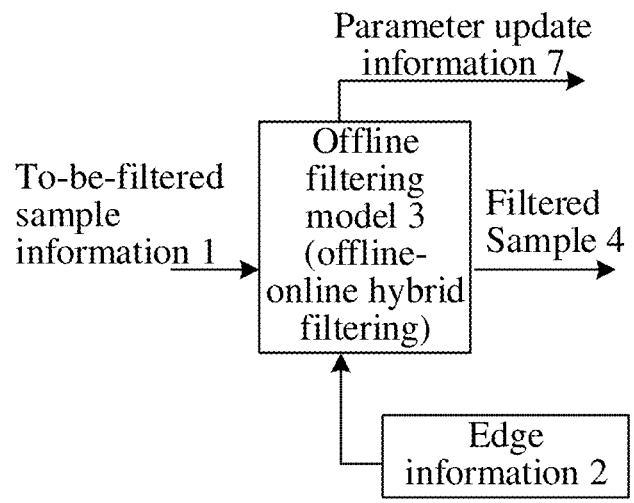
FIG. 9 is a schematic diagram of a fifth connecting mode of a filter in accordance with an implementation of the present application.

Illustratively, the filter is formed by an offline filtering model, herein, there are some online trained parameters in the offline filtering model. As shown in FIG. 9, the filtering apparatus inputs the to-be-filtered sample information 1 and its corresponding edge information 2 into the offline filtering model 3, and the filtered sample 4 is filtered output after offline-online hybrid filtering.

It can be understood that advantages of the offline filtering model are outstanding performance and that weight coefficients do not need to be transmitted additionally, its disadvantage is that it lacks adaptability to the sequence. An advantage of the online filtering model is its adaptability to the sequence, but the weight coefficients need to be transmitted. The manner in which the offline filtering portion is used in combination with the online filtering portion can not only use the performance of the offline filtering model, but also use the online filtering model to improve the objective quality of videos again. That is to say, the filtering apparatus in an implementation of the present application can obtain a compromise between generalization ability and sequence adaptability in the filtering of different videos, and can bring better coding performance under the condition of low complexity.

It should be noted that in an implementation of the present application, the filtering apparatus, after inputting the to-be-filtered sample information and the edge information to the neural network-based filter to output the filtered samples, trains the filter online based on the filtered samples to obtain online filtering parameters; after the online portions of the filter are trained based on the online filtering parameters, inputs the subsequent to-be-filtered sample information and the edge information into the updated filter for filtering to obtain the subsequent filtered samples; and the online filtering parameters are signaled in a video bitstream.

That is to say, in an implementation of the present application, the neural network is often trained based on random access segments (sample information of some videos in the video sequence that have just been encoded), and after the training, is immediately, used for the subsequent frames of the same sequence, that is, sample information of the subsequent frames. Such neural network is small in scale and can only be applied to a very narrow range of video contents. The trained weight parameters (i.e., online filtering parameters) need to be retrained and updated frequently. Therefore, the weight coefficients need to be transmitted in the bitstream.

The online filtering parameters will be described below by taking the to-be-filtered sample information of the videos to be filtered as an example.

Figure 10:
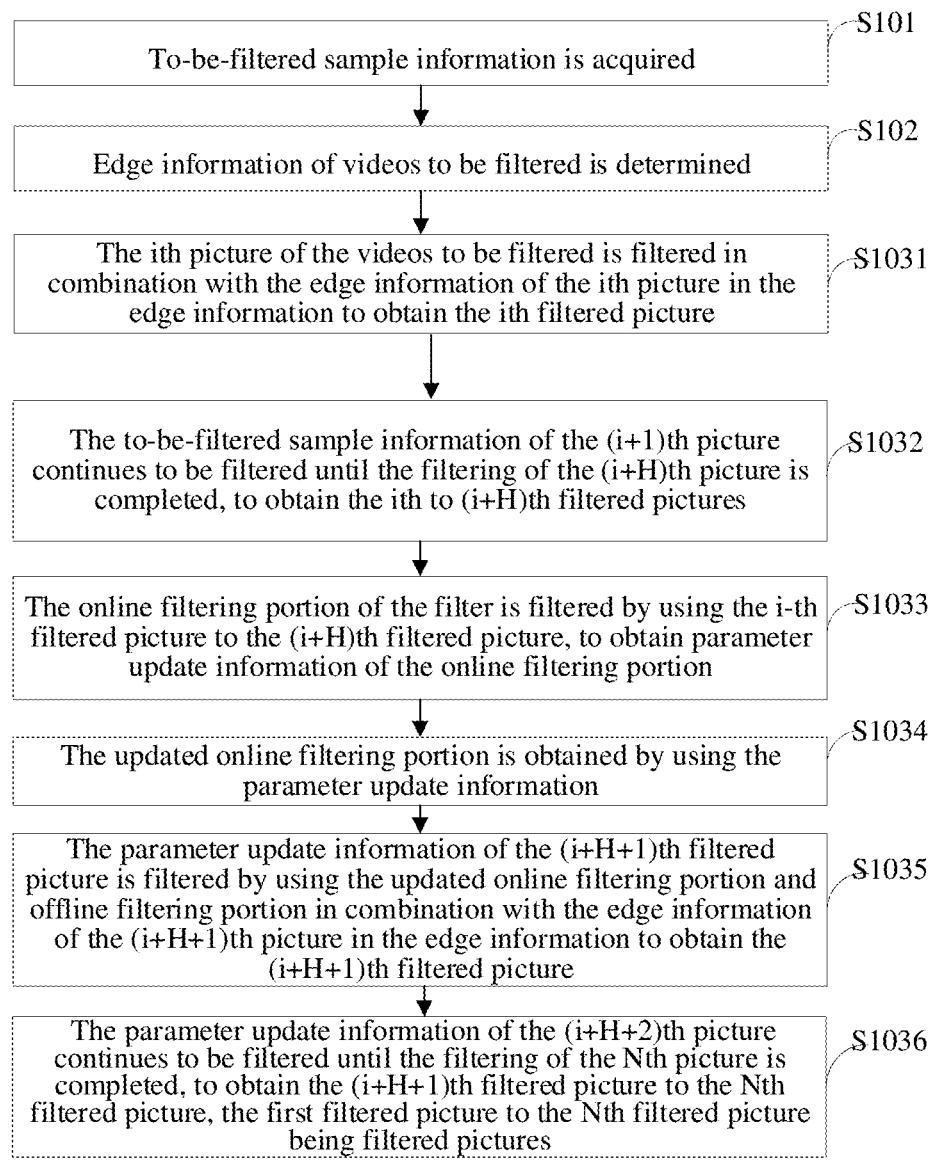
FIG. 10 is a flow chart of another optional filtering method in accordance with an implementation of the present application.

In some implementations of the present application, based on FIG. 3 and as shown in FIG. 10, an optional implementation process of S103 may include acts S1031-S1036 as follows:

In the act S1031, the to-be-filtered sample information of the ith picture of the videos to be filtered is filtered in combination with the edge information of the ith frame picture in the edge information to obtain the ith filtered picture, where i is greater than or equal to 1 and less than or equal to n, N is the total number of the videos to be filtered.

In the act S1032, the to-be-filtered sample information of the (i+1)th picture continues to be filtered until the filtering of the (i+H)th picture is completed, to obtain the ith to (i+H)th filtered pictures, where H is greater than 1 and less than N-i.

In the act S1033, the online filtering portion of the filter is trained by using the i-th filtered picture to the (i+H)th filtered picture, to obtain parameter update information of the online filtering portion.

In the act S1034, the updated online filtering portion is obtained by using the parameter update information.

In the act S1035, the parameter update information of the (i+H+1)th filtered picture is filtered by using the updated online filtering portion and offline filtering portion in combination with the edge information of the (i+H+1)th picture in the edge information to obtain the (i+H+1)th filtered picture.

In the act S1036, the parameter update information of the (i+H+2)th picture continues to be filtered until the filtering of the Nth picture is completed, to obtain the (i+H+1)th filtered picture to the Nth filtered picture, and the first filtered picture to the Nth filtered picture are filtered pictures.

In an implementation of the present application, since there are both the offline filtering portion and the online filtering portion in the filter, the difference is that some of the online filtering portion is directly implemented by the online filtering model, while some of the online filtering portion is implemented by online training of some parameters obtained in the offline filtering model, and the latter is implemented by combining the above two types of filtering.

It can be understood that the online filtering portion is trained based on random access segments (some videos just being filtered in the video sequence) to obtain the updated parameters. The updated online filtering model, which uses the updated parameters, processes subsequent frames of the same video sequence.

In an implementation of the present application, the videos to be filtered may contain N pictures, N is the total number of the videos to be filtered and is a positive integer greater than 1. The value of N is determined by the number of the videos to be filtered, which is not limited in the implementations of the present application.

Therefore, in an implementation of the present application, when filtering the ith picture in the videos to be filtered, the filtering apparatus inputs the edge information of the ith picture into the filter, and outputs the ith filtered picture after online filtering and offline filtering, wherein i starts from 1, that is, the filtering apparatus starts the filtering from the first picture. After the filtering of the ith picture is completed, the filtering apparatus continues to filter the (i+1)th picture until the filtering of the (i+H)th picture is completed, to obtain the ith filtered picture to the (i+H)th filtered picture, wherein H is greater than 1 and less than N-i. That is to say, when the filtering apparatus filters the videos to be filtered by using the filter including the online filtering portion and the offline filtering portion, after filtering a sequence of pictures, the filtering apparatus can retrain the online portions of the filter by using the filtered (i+H) pictures and (i+H) filtered pictures (ith to (i+H)th filtered pictures) as training samples. When the trained result is the closest to an output result of the (i+H) filtered pictures, the parameter update information of the online filtering portion at this time is obtained, and the updated online filtering portion is obtained by using the parameter update information. The filtering apparatus may filter the (i+H+1)th filtered picture in combination with the existing offline filtering portions and the edge information of the (i+H+1)th picture to obtain the (i+H+1)th filtered picture, and continue to filter the (i+H+2)th picture until the filtering of the Nth picture is completed, to obtain the (i+H+1)th filtered picture to the Nth filtered picture, and the first filtered picture to the Nth filtered picture are filtered pictures.

It should be noted that in an implementation of the present application, after filtering the (H-i) frames, the filtering apparatus can start to update the online filtering portion of the filter, and the specific value of H can be determined according to the actual demand and the specific design, which is not limited in the implementations of the present application.

It should also be noted that in the filtering of the (i+H+1)th picture to the Nth picture, when the Nth picture is not processed after the (H-i) pictures are processed, the online filtering portion can be updated again, and the subsequent frames can continue to be filtered by using the updated online filtering portion until the filtering of the Nth picture is completed. That is to say, after filtering an picture with a fixed number of frames, the filtering apparatus may start to update the online filtering parameters of the online filtering portion, or the numbers of filtered frames whenever the online filtering portion is updated may be different, which is not limited in the implementations of the present application. A condition to stop updating is that the filtering of the last picture is completed.

In some implementations of the present application, the online filtering portion may be the online filtering model, or may be a level of a part of the convolutional neural network in the offline model, which may be online update parameters to obtain parameter update information (i.e., online filtering parameters), or the online filtering portion may be a combination of the previous two online filtering portions, which is not limited in the implementations of the present application.

Figure 5:
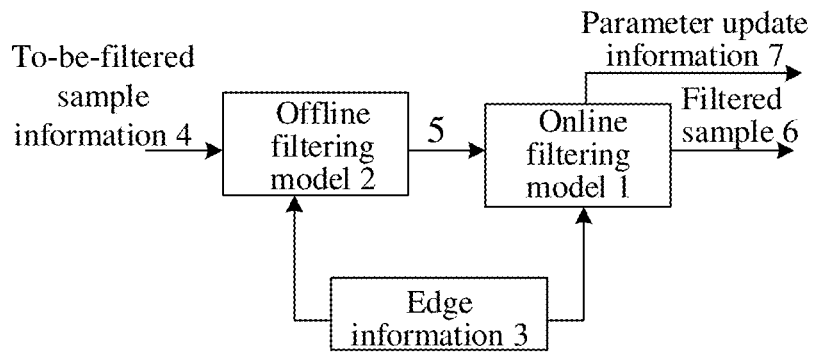
FIG. 5 is a schematic diagram of a first connecting mode of a filter in accordance with an implementation of the present application.
Figure 6:
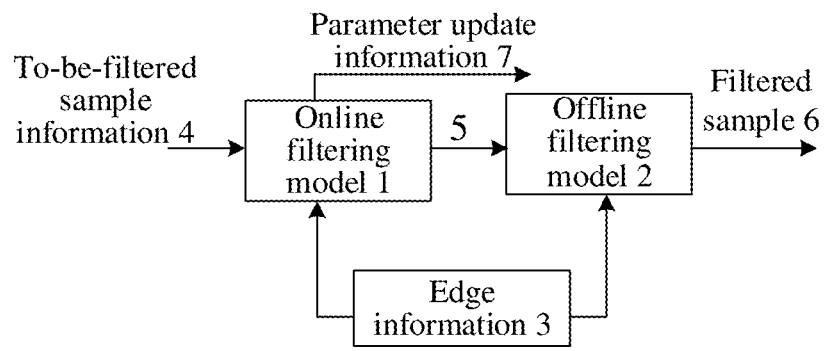
FIG. 6 is a schematic diagram of a second connecting mode of a filter in accordance with an implementation of the present application.

Illustratively, the filter is formed by the online filter model 1 (Online trained NN) concatenated with the offline filter model 2 (Offline trained NN), herein the concatenating sequence shown in FIG. 5 or the concatenating sequence shown in FIG. 6 can be used. For the filter in FIG. 5 and the filter in FIG. 6, the filtering apparatus inputs the to-be-filtered sample information 4 and its corresponding edge information 3 into the offline filtering model 2 and the online filtering model 1, and in the filtering process, the filtering apparatus can further train the online portions of the filter online by using the filtering result of the previous frame, that is, the online filtering model 1 is trained to obtain the parameter update information (i.e., online filtering parameters), such that after the online portions of the filter are trained based on the online filtering parameters, the subsequent to-be-filtered sample information and the edge information are input into the updated filter for filtering to obtain the subsequent filtered samples.

Illustratively, the filter is formed by the online filtering model concatenated with the offline filtering model, and there are some online trained parameters in the offline filtering model. The concatenating sequence as shown in FIG. 7 or the concatenating sequence as shown in FIG. 8 may be used. As shown in FIG. 7 and FIG. 8, the filtering apparatus inputs the to-be-filtered sample information 4 and its corresponding edge information 3 into the offline filtering model 2 (offline-online hybrid filtering) and the online filtering model 1, and in the filtering process, the filtering apparatus may further train the online portions of the filter online by using the filtering result of the previous frame, that is, the online portions in the offline filtering model 2 and the online filtering model 1 are trained to obtain the parameter update information (i.e., online filtering parameters), such that after the online portions of the filter are trained based on the online filtering parameters, the subsequent to-be-filtered sample information and the edge information are input into the updated filter for filtering to obtain the subsequent filtered samples.

Illustratively, the filter is formed by the offline filtering model, and there are some online trained parameters in the offline filtering model. As shown in FIG. 9, the filtering apparatus inputs the to-be-filtered sample information 4 and its corresponding edge information 3 into the offline filtering model 3, and filters and outputs the filtered samples 4 after offline-online hybrid filtering; meanwhile, the filtering apparatus may further train the online portions of the offline filtering model 3 online by using the filtering result of the previous frame, that is, the online portions of the offline filtering model 3 are trained to obtain the parameter update information (i.e., online filtering parameters), such that after the online portions of the filter are trained based on the online filtering parameters, the subsequent to-be-filtered sample information and the edge information are input into the updated filter for filtering to obtain the subsequent filtered samples.

It can be understood that the filtering apparatus, for the videos to be filtered, determines the edge information of the videos to be filtered, and inputs the edge information and the videos to be filtered into the filter for filtering to output the filtered picture. Because the filter is obtained by using the online filtering portion in combination with the offline filtering portion, the offline filtering portion may be used in the filtering, which is applicable to filtering of a wide range of videos; meanwhile, updating of the online filtering parameters of the online filtering portion can be ensured, and the subsequent frames of the videos to be filtered are filtered by using the updated online filtering portion, to avoid the degradation of filtering performance, such that not only the filtering performance of the filtering device can be improved, but also the application range is wide.

An implementation of the present application further provides a filtering method for encoding a video, which is applied to a coding end, including: determining filtering parameters of an adaptive filter; filtering input samples by using the adaptive filter according to the filtering parameters and edge information to obtain filtered samples; determining first filtering parameters, herein the first filtering parameters are a portion of the filtering parameters which needs to be encoded; and encoding the first filtering parameters and the first filtering parameters are signaled in a video bitstream.

The first filtering parameters are online filtering parameters, i.e., parameter update information.

In some implementations of the present application, the adaptive filter is a neural network filter.

In some implementations of the present application, the adaptive filter is a concatenating filter of a first neural network filter and a second neural network filter.

In some implementations of the present application, determining the filtering parameters of the adaptive filter includes: determining second filtering parameters of the neural network filter using offline training, herein the second filtering parameters are all parameters of the neural network filter; determining third filtering parameters of the neural network filter using online training, wherein the third filtering parameters are a portion of the parameters of the neural network filter; and updating the corresponding filtering parameters of the second filtering parameters by using the third filtering parameters, and using the updated second filtering parameters as all filtering parameters of the neural network filter.

In some implementations of the present application, determining the first filtering parameters includes: using the third filtering parameters as the first filtering parameters.

In some implementations of the present application, determining the filtering parameters of the adaptive filter includes: determining all filtering parameters of the first neural network filter by using offline training; and determining fourth filtering parameters of the second neural network filter by using online training, herein the fourth filtering parameters are all parameters of the second neural network filter.

In some implementations of the present application, determining the first filtering parameters includes: using the fourth filtering parameters as the first filtering parameters.

In some implementations of the present application, determining the filtering parameters of the adaptive filter includes: determining fifth filtering parameters of the first neural network filter by using offline training, herein the fifth filtering parameters are all parameters of the first neural network filter; determining sixth filtering parameters of the neural network filter by using online training, herein the sixth filtering parameter are a portion of the parameters of the first neural network filter; updating the corresponding filtering parameters of the fifth filtering parameters by using the sixth filtering parameters, and using the updated fifth filtering parameters as the filtering parameters of the first neural network filter; and in a process of encoding the video or picture, determining seventh filtering parameters of the second neural network filter using online training, herein the seventh filtering parameters are all parameters of the second neural network filter.

In some implementations of the present application, determining the first filtering parameters includes: using the sixth filtering parameters and the seventh filtering parameters as the first filtering parameters.

In some implementations of the present application, the offline training is a process of training the neural network filter by using one or more pictures before the video or picture is encoded.

The online training is a process of training the neural network filter by using one or more pictures in a video sequence to be encoded during encoding of the video or picture.

In some implementations of the present application, the adaptive filter is a pre-processing filter or an in-loop filter used in encoding of the video.

It should be noted that a manner of updating the filtering parameters (picture adaptive, or sequence adaptive) can adopt random access segment or sequence adaptive, which is not limited in the implementation of the present application.

It can be understood that a filtering apparatus, when located at the coding end, determines the filtering parameters of the adaptive filter; filters the input samples by using the adaptive filter according to the filtering parameters and the edge information to obtain the filtered samples; determines the first filtering parameters, herein the first filtering parameters are a portion of the filtering parameters (online filtering parameters) which needs to be encoded; encodes the first filtering parameters and the first filtering parameters are signaled in a video bitstream. Because the filter is obtained by using an online filtering portion in combination with an offline filtering portion, the offline filtering portion can be used in the filtering, which is applicable to filtering of a wide range of videos; meanwhile, updating of some models of the online filtering portion can be ensured to avoid the degradation of filtering performance, such that not only the filtering performance of the filtering apparatus can be improved, but also the application range is wide.

An implementation of the present application further provides a filtering method for decoding a video, which is applied to a decoding end and includes: parsing a video bitstream and determining first filtering parameters of an adaptive filter, herein the first filtering parameters are a portion of all filtering parameters of the adaptive filter; determining all the filtering parameters of the adaptive filter according to the first filtering parameters; and filtering input samples by using the adaptive filter according to all the filtering parameters and edge information to obtain filtered samples.

It should be noted that the first filtering parameter are online filtering parameters, i.e., parameter update information.

In some implementations of the present application, the adaptive filter is a neural network filter.

In some implementations of the present application, the adaptive filter is formed by concatenating two or more neural network filters of different types.

In some implementations of the present application, the adaptive filter is a concatenating filter of a first neural network filter and a second neural network filter.

In some implementations of the present application, determining all the filtering parameters of the adaptive filter includes: determining second filtering parameters of the neural network filter, herein the second filtering parameters are all parameters of the neural network filter; and updating the corresponding filtering parameters of the second filtering parameters by using the first filtering parameters, and using the updated second filtering parameters as all filtering parameters of the neural network filter.

In some implementations of the present application, determining the second filtering parameters of the neural network filter includes: determining the second filtering parameters of the neural network filter by using offline training; or obtaining the second filtering parameters before the video bitstream is decoded.

In some implementations of the present application, determining all the filtering parameters of the adaptive filter includes: determining all filtering parameters of the first neural network filter; and using the first filtering parameters as all filtering parameters of the second neural network filter.

In some implementations of the present application, determining all filtering parameters of the first neural network filter includes: determining all the filtering parameters of the first neural network filter by using offline training; or obtaining all the filtering parameters of the first neural network filter before the video bitstream is decoded.

In some implementations of the present application, determining all the filtering parameters of the adaptive filter includes: determining fifth filtering parameters of the first neural network filter, herein the fifth filtering parameters are all parameters of the first neural network filter; using a portion of the first filtering parameters as sixth filtering parameters, herein the sixth filtering parameters are a portion of the first neural network filter; updating the corresponding filtering parameters of the fifth filtering parameters by using the sixth filtering parameters, and using the updated fifth filtering parameters as all filtering parameters of the first neural network filter; and using the other portion of the first filtering parameters as all parameters of the second neural network filter.

In some implementations of the present application, determining the fifth filtering parameters of the first neural network filter includes: determining the fifth filtering parameters by using offline training; or obtaining the fifth filtering parameters before the video bitstream is decoded.

In some implementations of the present application, the offline training is a process of training the neural network filter by using one or more pictures before the video bitstream is parsed.

In some implementations of the present application, the adaptive filter is an in-loop filter or a post-processing filter used in decoding of the video bitstream.

It should be noted that a manner of updating the filtering parameters (picture adaptive, or sequence adaptive) can adopt sequence adaptive, which is not limited in the implementation of the present application.

It can be understood that a filtering apparatus, when located at the decoding end, determines the first filtering parameters of the adaptive filter by parsing the video bitstream, herein the first filtering parameters are a portion of all the filtering parameters (online filtering parameters) of the adaptive filter; determines all the filtering parameters (online filtering parameters and offline filtering parameters) of the adaptive filter according to the first filtering parameters; and filters the input samples by using the adaptive filter according to all the filtering parameters and edge information to obtain the filtered samples. Because the filter is obtained by using an online filtering portion in combination with an offline filtering portion, the offline filtering portion can be used in the filtering, which is applicable to filtering of a wide range of videos; meanwhile, updating of some models of the online filtering portion can be ensured to avoid the degradation of filtering performance, such that not only the filtering performance of the filtering device can be improved, but also the application range is wide.

Figure 11:
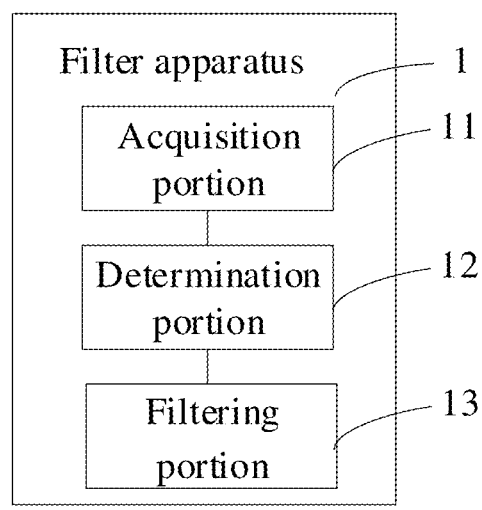
FIG. 11 is a schematic structural diagram of an optional filtering apparatus in accordance with an implementation of the present application.

Based on the same inventive concept, FIG. 11 is a schematic structural diagram of a filtering apparatus in an implementation of the present application. As shown in FIG. 11, the filtering apparatus 1 may include an acquisition portion 11, a determination portion 12 and a filtering portion 13, herein:

The first acquisition portion 11 is configured to acquire to-be-filtered sample information;

the first determination portion 12 is configured to determine edge information; and the filtering portion 13 is configured to input the to-be-filtered sample information and the edge information into a neural network-based filter to output filtered samples, herein the filter is obtained by using an online filtering portion in combination with an offline filtering portion.

In some implementations of the present application, the filter is formed by an online filtering model concatenated with an offline filtering model; or the filter is formed by an online filtering model concatenated with an offline filtering model, herein there are some online trained parameters in the offline filtering model.

In some implementations of the present application, the filter is formed by an offline filtering model, wherein there are some online trained parameters in the offline filtering model.

The first filtering portion 13 is further configured to input the to-be-filtered sample information and the edge information into the neural network-based offline filtering model to output the filtered samples.

In some implementations of the present application, the first filtering portion 13 is further configured to input the to-be-filtered sample information and the edge information into the neural network-based offline filtering model to output intermediate filtered samples; and input the intermediate filtered samples and the edge information into the neural network-based online filtering model to output the filtered samples; or, input the to-be-filtered sample information and the edge information into the neural network-based online filtering model to output intermediate filtered samples; and input the intermediate filtered samples and the edge information into the neural network-based offline filtering model to output the filtered samples.

In some implementations of the present application, the filter further includes a first training portion 14 and a first signaling portion 15.

The first training portion 14 is configured to, after inputting the to-be-filtered sample information and the edge information into the neural network-based filter to output the filtered samples, train the filter online based on the filtered samples to obtain online filtering parameters.

The first filtering portion 13 is further configured to input subsequent to-be-filtered sample information and the edge information into the updated filter for filtering after online portions of the filter are trained based on the online filtering parameters, to obtain subsequent filtered samples.

The first signaling portion 15 is configured to signal the online filtering parameters in a video bitstream.

In some implementations of the present application, the offline filtering model is an offline trained filter, herein the offline filtering model further includes offline trained parameters.

The online filtering model is an online trained filter, herein the online filtering model includes online trained parameters.

In some implementations of the present application, the neural network-based filter is applicable to post-processing filtering, in-loop filtering, pre-processing filtering and prediction process.

In some implementations of the present application, when the neural network-based filter is applicable to post-processing filtering, it is arranged at a decoding end;

when the neural network-based filter is applicable to in-loop processing filtering, it is arranged at a decoding end and a coding end; and when the neural network-based filter is applicable to pre-processing filtering, it is arranged at a coding end.

An implementation of the present application further provides a filtering apparatus for encoding a video, which includes: a second determination portion 20, configured to determine filtering parameters of an adaptive filter; a second filtering portion 21, configured to filter input samples by using the adaptive filter according to the filtering parameters and edge information to obtain filtered samples; herein the second determination portion 20 is further configured to determine first filtering parameters, herein the first filtering parameters are a portion of the filtering parameters which needs to be encoded; and a second signaling portion 22, configured to encode the first filtering parameters and signal the first filtering parameters in a video bitstream.

In some implementations of the present application, the adaptive filter is a neural network filter.

In some implementations of the present application, the adaptive filter is a concatenating filter of a first neural network filter and a second neural network filter.

In some implementations of the present application, the second determination portion 20 is further configured to determine second filtering parameters of the neural network filter by using offline training, herein the second filtering parameters are all parameters of the neural network filter; determine third filtering parameters of the neural network filter by using online training, herein the third filtering parameters are a portion of the parameters of the neural network filter; and update the corresponding filtering parameters of the second filtering parameters by using the third filtering parameters, and use the updated second filtering parameters as all filtering parameters of the neural network filter.

In some implementations of the present application, the second determination portion 20 is further configured to use the third filtering parameters as the first filtering parameters.

In some implementations of the present application, the second determination portion 20 is further configured to determine all filtering parameters of the first neural network filter by using offline training; determine fourth filtering parameters of the second neural network filter by using online training, herein the fourth filtering parameters are all parameters of the second neural network filter.

In some implementations of the present application, the second determination portion 20 is further configured to use the fourth filtering parameters as the first filtering parameters.

In some implementations of the present application, the second determination portion 20 is further configured to determine fifth filtering parameters of the first neural network filter by using offline training, herein the fifth filtering parameters are all parameters of the first neural network filter; determine sixth filtering parameters of the neural network filter by using online training, herein the sixth filtering parameter are a portion of the parameters of the first neural network filter; update the corresponding filtering parameters of the fifth filtering parameters by using the sixth filtering parameters, and use the updated fifth filtering parameters as the filtering parameters of the first neural network filter; in a process of encoding the video or picture, determining seventh filtering parameters of the second neural network filter by using online training, herein the seventh filtering parameters are all parameters of the second neural network filter.

In some implementations of the present application, the second determination portion 20 is further configured to use the sixth filtering parameters and the seventh filtering parameters as the first filtering parameters.

In some implementations of the present application, the offline training is a process of training the neural network filter by using one or more pictures before the video or picture is encoded.

The online training is a process of training the neural network filter by using one or more pictures in a video sequence to be encoded during encoding of the video or picture.

In some implementations of the present application, the adaptive filter is a pre-processing filter or an in-loop filter used in encoding of the video.

It can be understood that the filtering apparatus, when located at the coding end, determines the filtering parameters of the adaptive filter; filters the input samples by using the adaptive filter according to the filtering parameters and the edge information to obtain the filtered samples; determines the first filtering parameters, herein the first filtering parameters are a portion of the filtering parameters (online filtering parameters) which needs to be encoded; encodes the first filtering parameters and the first filtering parameters are signaled in a video bitstream. Because the filter is obtained by using an online filtering portion in combination with an offline filtering portion, the offline filtering portion may be used in the filtering, which is applicable to filtering of a wide range of videos; meanwhile, updating of some models of the online filtering portion can be ensured to avoid the degradation of filtering performance, such that not only the filtering performance of the filtering apparatus can be improved, but also the application range is wide.

An implementation of the present application further provides a filtering apparatus for decoding a video bitstream, which includes: a third determination portion 30, configured to parse a video bitstream and determine first filtering parameters of an adaptive filter, herein the first filtering parameters are a portion of all filtering parameters of the adaptive filter; and determine all the filtering parameters of the adaptive filter according to the first filtering parameters; and a third filtering portion 31, configured to filter input samples by using the adaptive filter according to all the filtering parameters and edge information to obtain filtered samples.

In some implementations of the present application, the adaptive filter is a neural network filter.

In some implementations of the present application, the adaptive filter is formed by concatenating two or more neural network filters of different types.

In some implementations of the present application, the adaptive filter is a concatenating filter of a first neural network filter and a second neural network filter.

In some implementations of the present application, the third determination portion 30 is further configured to determine second filtering parameters of the neural network filter, herein the second filtering parameters are all parameters of the neural network filter; update the corresponding filtering parameters of the second filtering parameters by using the first filtering parameters, and use the updated second filtering parameters as all filtering parameters of the neural network filter.

In some implementations of the present application, the third determination portion 30 is further configured to determine the second filtering parameters of the neural network filter by using offline training; or obtain the second filtering parameters before the video bitstream is decoded.

In some implementations of the present application, the third determination portion 30 is further configured to determine all filtering parameters of the first neural network filter; and use the first filtering parameters as all filtering parameters of the second neural network filter.

In some implementations of the present application, the third determination portion 30 is further configured to determine all the filtering parameters of the first neural network filter by using offline training; or obtain all the filtering parameters of the first neural network filter before the video bitstream is decoded.

In some implementations of the present application, the third determination portion 30 is further configured to determine fifth filtering parameters of the first neural network filter, herein the fifth filtering parameters are all parameters of the first neural network filter; use portion of the first filtering parameters as sixth filtering parameters, herein the sixth filtering parameters are a portion of the first neural network filter; update the corresponding filtering parameters of the fifth filtering parameters by using the sixth filtering parameters, and use the updated fifth filtering parameters as all filtering parameters of the first neural network filter; and use the other portion of the first filtering parameters as all parameters of the second neural network filter.

In some implementations of the present application, the third determination portion 30 is further configured to determine the fifth filtering parameters by using offline training; or obtain the fifth filtering parameters before the video bitstream is decoded.

In some implementations of the present application, the offline training is a process of training the neural network filter using one or more pictures before the video bitstream is parsed.

In some implementations of the present application, the adaptive filter is an in-loop filter or a post-processing filter used in decoding of the video bitstream.

It can be understood that the filtering apparatus, when located at the decoding end, determines the first filtering parameters of the adaptive filter by parsing the video bitstream, the first filtering parameters are a portion of all the filtering parameters (online filtering parameters) of the adaptive filter; determines all the filtering parameters (online filtering parameters and offline filtering parameters) of the adaptive filter according to the first filtering parameters; and filters the input samples by using the adaptive filter according to all the filtering parameters and edge information to obtain the filtered samples. Because the filter is obtained by using an online filtering portion in combination with an offline filtering portion, the offline filtering portion may be used in the filtering, which is applicable to filtering of a wide range of videos; meanwhile, updating of some models of the online filtering portion can be ensured to avoid the degradation of filtering performance, such that not only the filtering performance of the filtering device can be improved, but also the application range is wide.

It can be understood that, in implementations of the present application, a "unit" may be a portion of a circuit, a portion of a processor, a portion of a program or software, etc.; of course, may be a module, or may be non-modular. In addition, various components in the implementations may be integrated into one processing unit, or various units may exist physically separately, or two or more than two units may be integrated into one unit. The integrated units may be implemented in the form of hardware, or may be implemented in the form of a software functional module.

The integrated unit, if implemented in the form of a software functional module and sold or used as an independent product, may be stored in a computer-readable storage medium. Based on such understanding, the technical scheme of the present application, in essence, or the part contributing to the prior art, or all or part of the technical scheme, may be embodied in the form of a software product, which is stored in a storage medium, and includes several instructions for causing a computer device (which may be a personal computer, a server, or a network device, etc.) to perform all or part of the steps of the methods in the implementations. The aforementioned storage medium includes various media, such as a U disk, a mobile hard disk, a read-only memory (ROM), a random access memory (RAM), a magnetic disk, or an optical disk, which are capable of storing program codes.

Figure 12:
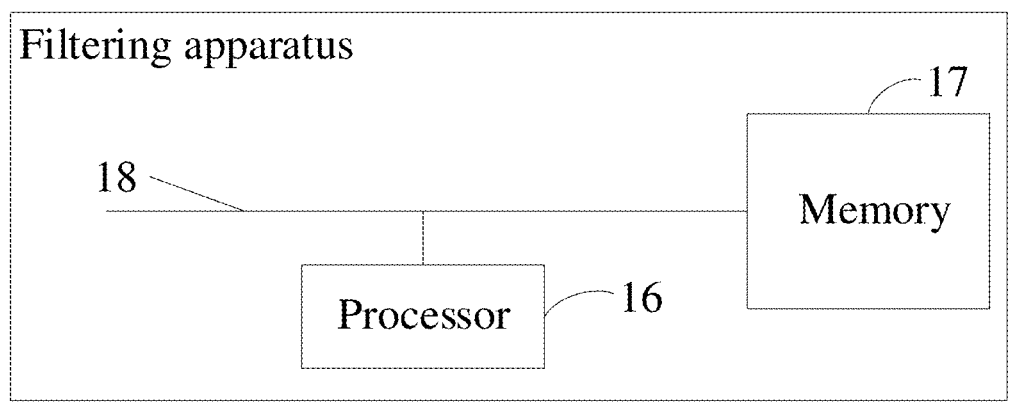
FIG. 12 is a schematic structural diagram of another optional filtering apparatus in accordance with an implementation of the present application.

FIG. 12 is a schematic structural diagram of an optional filtering apparatus in an implementation of the present application. The filtering apparatus provided by the implementation of the present application includes: a memory 17, configured to store executable instructions; and a processor 16, configured to implement the filtering methods in accordance with the implementations of the present application when executing the executable instructions stored in the memory 17.

It should be noted that in practical applications, various components in a terminal are coupled together through communication buses 18. It may be understood that the communication buses 18 are used for implementing connections and communications between these components. In addition to data buses, the communication buses 18 further includes power buses, control buses and status signal buses. However, for the sake of clear, various buses are labeled as the communication bus 18 in FIG. 12.

An implementation of the present application provides a computer storage medium having stored therein executable instructions, which, when executed by a processor, is used for implementing the filtering methods provided by the implementations of the present application.

It may be understood that the memory in the implementations of the present application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. Through exemplary but non-restrictive description, many forms of RAMs may be available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct Rambus dynamic random access memory (DR RAM). The memory in the systems and methods described in this specification is aimed at including but being not limited to these and any memory of another proper type.

The processor may be an integrated circuit chip having a signal processing capability. In an implementation process, the steps of the foregoing method implementations may be implemented by using an integrated logic circuit of hardware in the processor or instructions in a form of software. The processor described above may be a general purpose processor, a digital signal processor (DSP), an application specific integrated circuit (ASIC), a field programmable gate array (FPGA) or other programmable logic devices, a discrete gate or a transistor logic device, or a discrete hardware component. The processor may implement or perform various methods, steps and logical block diagrams disclosed in the implementations of the present application. The general purpose processor may be a microprocessor, or the processor may also be any conventional processor, or the like. The steps of the methods disclosed in the implementations of the present application may be directly embodied to be completed by a hardware decoding processor, or may be completed by a combination of hardware and software modules in the decoding processor. The software modules may be located in a storage medium which is mature in the art, such as a random access memory, a flash memory, a read-only memory, a programmable read-only memory, an electrically erasable programmable memory, a register, etc. The storage medium is located in the memory, and the processor reads information in the memory and completes the steps of the foregoing methods in combination with its hardware.

It may be understood that the implementations described herein may be implemented by hardware, software, firmware, middleware, microcode or a combination thereof. For the implementation by hardware, a processing unit may be implemented in one or more application specific integrated circuits (ASICs), digital signal processors (DSPs), DSP Devices (DSPDs), programmable logic devices (PLDs), field programmable gate arrays (FPGAs), general purpose processors, controllers, microcontrollers, microprocessors, other electronic modules for performing the functions described in the present application, or combinations thereof.

For the implementation by software, the techniques described herein may be implemented by the modules (e.g., procedures, functions, etc.) that perform the functions described herein. Software codes may be stored in a memory and executed by a processor. The memory may be implemented in the processor or external to the processor.

It should be noted that in the present application, the terms "include", "contain" or any other variations thereof are intended to cover a non-exclusive inclusion, such that a process, method, article, or device that includes a list of elements includes not only those elements but also other elements not expressly listed, or further includes elements inherent to such process, method, article, or device. An element defined by a statement "include one" does not exclude presence of additional identical elements in the process, method, article or system that includes the element, without more limitations.

The above-mentioned serial numbers of the implementations of the present application are only for description, and do not represent superiority and inferiority of the implementations.

Through the description of the above implementations, those skilled in the art can clearly understand that the methods in accordance with the above implementations can be implemented by means of software plus necessary general hardware platform, and of course they can also be implemented by hardware, but the former are better implementations in many cases. Based on such understanding, the technical solutions of the implementations of the present invention, in essence, or the part contributing to the prior art, can be embodied in the form of a software product stored in a storage medium (such as ROM/RAM, magnetic disk, optical disk), including several instructions for causing a terminal (which may be a mobile phone, a computer, a server, an air conditioner or a network device) to perform the methods described in various implementations of the present invention.

The implementations of the present invention have been described above in conjunction with the accompanying drawings, but the present invention is not limited to the above specific implementations, which are only illustrative and not restrictive. Under the inspiration of the present invention, people of ordinary skill in the art can make many variations which are within the protection scope of the present invention without departing from the spirit of the present invention and the scope protected by the claims.

INDUSTRIAL APPLICABILITY

In implementations of the present application, a filtering device determines edge information of videos to be filtered for the to-be-filtered sample information of the videos to be filtered, and inputs the edge information and the to-be-filtered sample information into a filter for filtering, to output filtered samples. Because the filter is obtained by using an online filtering portion in combination with an offline filtering portion, the offline filtering portion may be used in the filtering, which is applicable to filtering a wide range of videos; meanwhile, updating of some models of the online filtering portion can be ensured to avoid the degradation of filtering performance, such that the filtering performance of the filtering device can be improved, and the application range is wide.

What we claim is:

1. A filtering method for encoding a video, comprising:
determining filtering parameters of an adaptive filter;
filtering input samples by using the adaptive filter according to the filtering parameters and edge information to obtain filtered samples;
determining first filtering parameters, wherein the first filtering parameters are a portion of the filtering parameters which need to be encoded;
encoding the first filtering parameters, wherein the first filtering parameters are signaled in a video bitstream;
wherein the adaptive filter is a neural network filter.

2. The method of claim 1, wherein the adaptive filter is a concatenating filter formed by a first neural network filter concatenated with a second neural network filter.

3. The method of claim 1, wherein determining the filtering parameters of the adaptive filter comprises:
determining all or a portion of filtering parameters of the adaptive filter by using online training;
and/or
determining all or a portion of filtering parameters of the adaptive filter by using offline training.

4. The method of claim 3, wherein the determining all or a portion of filtering parameters of the adaptive filter by using online training comprises at least one of the following:
determining third filtering parameters of the neural network filter by using online training, wherein the third filtering parameters are a portion of the parameters of the neural network filter;
determining fourth filtering parameters of the second neural network filter by using online training, wherein the fourth filtering parameters are all parameters of the second neural network filter; or
determining sixth filtering parameters of the neural network filter by using online training, wherein the sixth filtering parameter are a portion of the parameters of the first neural network filter.

5. The method of claim 1, wherein
the adaptive filter is a pre-processing filter or an in-loop filter used in encoding of the video.

6. A filtering method for decoding a video bitstream, comprising:
parsing a video bitstream and determining first filtering parameters of an adaptive filter, wherein the first filtering parameters are a portion of all filtering parameters of the adaptive filter;
determining all the filtering parameters of the adaptive filter according to the first filtering parameters;
filtering input samples by using the adaptive filter according to all the filtering parameters and edge information to obtain filtered samples; wherein
the adaptive filter is a neural network filter.

7. The method of claim 6, wherein
the adaptive filter is formed by concatenating two or more neural network filters of different types; wherein
the adaptive filter is a concatenating filter formed by a first neural network filter concatenated with a second neural network filter.

8. The method of claim 7, wherein determining all the filtering parameters of the adaptive filter comprises:
determining all filtering parameters of the first neural network filter;
using the first filtering parameters as all filtering parameters of the second neural network filter; wherein determining all filtering parameters of the first neural network filter comprises:
determining all the filtering parameters of the first neural network filter by using offline training; or
obtaining all the filtering parameters of the first neural network filter before the video bitstream is decoded.

9. The method of claim 7, wherein determining all the filtering parameters of the adaptive filter comprises:
determining all filtering parameters of the first neural network filter;
determining filtering parameters of the second neural network filter according to a portion of the first filtering parameters;
wherein, determining all filtering parameters of the first neural network filter comprises:
updating all parameters of the first neural network filter by using the other portion of the first filtering parameters, and using the updated filtering parameters as all filtering parameters of the first neural network filter.

10. The method of claim 6, wherein determining all the filtering parameters of the adaptive filter comprises:
determining second filtering parameters of the neural network filter, wherein the second filtering parameters are all parameters of the neural network filter;
updating corresponding filtering parameters of the second filtering parameters by using the first filtering parameters, and using the updated second filtering parameters as all filtering parameters of the neural network filter.

11. The method of claim 10, wherein determining the second filtering parameters of the neural network filter comprises:
determining the second filtering parameters of the neural network filter by using offline training; or
obtaining the second filtering parameters before the video bitstream is decoded.

12. The method of claim 10, wherein
the adaptive filter is an in-loop filter or a post-processing filter used in decoding of the video bitstream.

* * * * *